United States Patent
Haynes et al.

(10) Patent No.: US 10,051,597 B2
(45) Date of Patent: *Aug. 14, 2018

(54) RADIO ACCESS POINT LOCATION VERIFICATION USING GPS LOCATION AND RADIO ENVIRONMENT DATA

(71) Applicant: Cisco Technology, Inc., San Jose, CA (US)

(72) Inventors: Edward Haynes, Suwanee, GA (US); Archie Hensley, Suwanee, GA (US); Anton Okmyanskiy, Vancouver (CA); Jeffrey Antoline, Roswell, GA (US); Mickael Graham, Bellevue Hill (AU)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/404,411

(22) Filed: Jan. 12, 2017

(65) Prior Publication Data

US 2017/0127374 A1    May 4, 2017

Related U.S. Application Data

(63) Continuation of application No. 14/873,285, filed on Oct. 2, 2015, now Pat. No. 9,603,119, which is a
(Continued)

(51) Int. Cl.
*H04W 24/00* (2009.01)
*H04W 64/00* (2009.01)
*G01S 5/02* (2010.01)

(52) U.S. Cl.
CPC ......... *H04W 64/003* (2013.01); *G01S 5/0242* (2013.01)

(58) Field of Classification Search
CPC .......................... H04W 64/003; G01S 5/0242
See application file for complete search history.

(56) References Cited

U.S. PATENT DOCUMENTS

| 2004/0072574 A1 | 4/2004 | Matz et al. |
| 2007/0254620 A1 | 11/2007 | Lindqvist et al. |

(Continued)

FOREIGN PATENT DOCUMENTS

| WO | 2006002458 A1 | 1/2006 |
| WO | 2008051124 | 5/2008 |
| WO | 2008121178 A1 | 10/2008 |

OTHER PUBLICATIONS

PCT International Search Report and Written Opinion in counterpart International Application No. PCTUS2010/024224, dated May 3, 2010.

(Continued)

*Primary Examiner* — Wayne H Cai
(74) *Attorney, Agent, or Firm* — Edell, Shapiro & Finnan, LLC

(57) ABSTRACT

Techniques are provided to perform location verification of a radio access point device such as femtocell. The radio access point device is configured to receive signals from global positioning system (GPS) satellite transmitters to produce GPS location data representing a GPS location of the radio access point device. The radio access point device is also configured to receive wireless signals at one or more specified channels and to generate radio environment data representing characteristics of received wireless signals. A comparison is made between the GPS location data and reference GPS location data for an expected location of the radio access point device. When the GPS location data substantially matches the reference GPS location data, operations of the radio access point device are enabled and the radio environment data is stored to be used as reference
(Continued)

radio environment data for purposes of subsequent location verification of the radio access point device.

20 Claims, 12 Drawing Sheets

Related U.S. Application Data continuation of application No. 12/372,398, filed on Feb. 17, 2009, now Pat. No. 9,207,304.

(56) References Cited

U.S. PATENT DOCUMENTS

| | | |
|---|---|---|
| 2008/0085722 A1 | 10/2008 | Hirano et al. |
| 2009/0129263 A1 | 5/2009 | Osborn |
| 2010/0027469 A1 | 2/2010 | Gurajala et al. |
| 2010/0120447 A1 | 5/2010 | Anderson et al. |
| 2010/0144366 A1 | 6/2010 | Ishii et al. |
| 2010/0210280 A1 | 8/2010 | Haynes et al. |
| 2016/0029341 A1 | 1/2016 | Haynes et al. |

OTHER PUBLICATIONS

GSMA: "Femtocell Deployment Security Issues White Paper," 3GPP Draft, 83-081097GSMA FCG Security White Paper, 3rd Generation Partnership Project (3GPP) Sep. 18, 2008.
English Translation of Office Action in counterpart Chinese Application No. 201080008091.3, dated Aug. 2, 2013, 7 pages.

RADIO ACCESS POINT LOCATION VERIFICATION USING GPS LOCATION AND RADIO ENVIRONMENT DATA

CROSS REFERENCE TO RELATED APPLICATION

This application is a continuation of U.S. application Ser. No. 14/873,285, filed Oct. 2, 2015, which is in turn a continuation of U.S. application Ser. No. 12/372,398, filed Feb. 17, 2009, now U.S. Pat. No. 9,207,304. The entirety of each of these applications is incorporated herein by reference.

TECHNICAL FIELD

The present disclosure relates to managing operations of radio access point devices, such as femtocell access point devices, in wireless communication networks.

BACKGROUND

Femtocell access point devices are radio access point devices that are deployed at subscriber sites in order to improve coverage of mobile wireless communication service (e.g., cell phone, wireless messaging, etc.) and thereby offload the burden on the infrastructure of the mobile service provider. Femtocell access points are essentially cellular transceiver towers. Like cell towers, femtocell access points operate in a licensed spectrum that is subject to strict regulatory constraints on service providers. For example, a femtocell access point should not transmit on a frequency that is not licensed by a service provider in a given location. The Federal Communication Commission (FCC) requirements in the United States are particularly strict and a service provider may have licensed different frequencies in different parts of the country. As a result of this regulatory environment, femtocell access point deployments require ongoing location verification.

Techniques to perform location verification typically involve two mechanisms: Global Positioning System (GPS) based location and radio network scan. GPS location techniques require a line-of-sight from the femtocell access point device to the sky and the GPS receiver in the femtocell access point has to "lock" to signals from several different satellites in order to obtain an accurate GPS location. Moreover, a GPS location procedure may require up to 20 minutes (or longer) in order to lock to signals from the satellites. The use of an external antenna partially alleviates the line-of-sight issues. However, the relatively long period of time needed to lock to the satellites is undesirable, particularly when the femtocell access point device is rebooting and cannot resume serving devices in the wireless network until the location has been verified on reboot.

The radio scan function of the femtocell access point allows it to listen to its radio environment and detect neighbor cellular transceivers. Neighbor cellular transceiver "towers" transmit signals that contain basic information, such as country, network and cellular transceiver identification. At a basic level, the radio scan function allows a femtocell access point to ascertain that it is in the right country and in the neighborhood of the correct "macro" cell(s). However, this information alone may not be sufficient to determine the precise geographic location of the femtocell access point device and the corresponding frequency on which the femtocell access point should operate.

DESCRIPTION OF EXAMPLE EMBODIMENTS

Techniques are provided to perform location verification of a radio access point device. The radio access point device is configured to receive signals from global positioning system (GPS) satellite transmitters to produce GPS location data representing a geographical location of the radio access point device. The radio access point device is also configured to receive wireless signals at one or more channels and to generate radio environment data representing characteristics of received wireless signals at the one or more channels in an environment or vicinity of the radio access point device. A comparison is made between the GPS location data and reference GPS location data for an expected location of the radio access point device. The expected location can be determined based on subscriber registration data. When the GPS location data substantially matches the reference GPS location data, service of the radio access point device is enabled and the radio environment data is stored to be used as reference radio environment data for purposes of subsequent location verification of the radio access point device, which may allow future location verification to bypass the GPS test.

Figure 1:
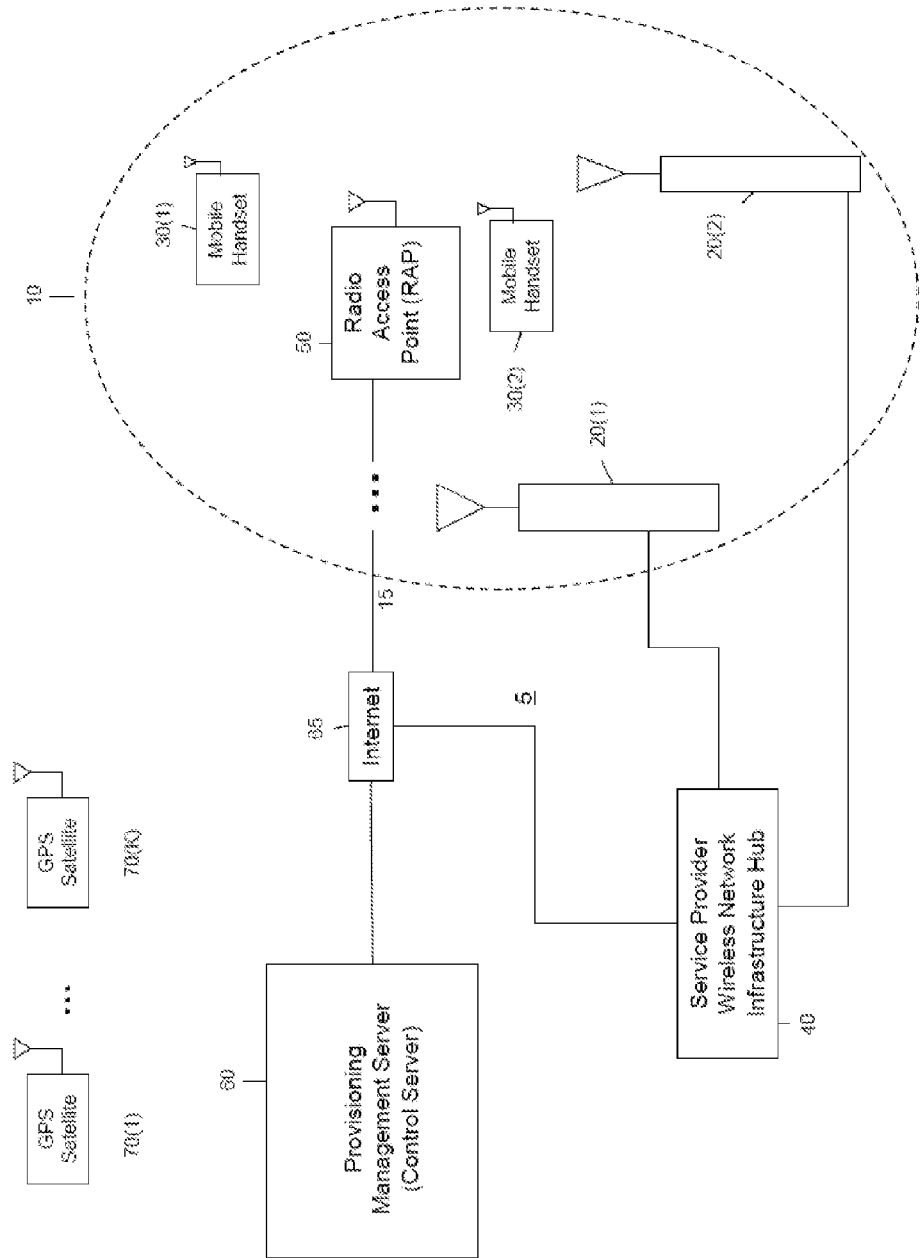
FIG. 1 is an example of a block diagram of a wireless communication network in which location verification techniques described herein are employed when enabling service of radio access point devices.

Referring first to FIG. 1, a communication system 5 is shown in which a wide area wireless communication network 10, e.g., a wireless cellular network, is deployed. The network 10 comprises a plurality of cellular radio transceiver "towers", two of which are shown at 20(1) and 20(2) to serve wireless network clients, e.g., multiple mobile wireless handset devices, two of which are shown at 30(1) and 30(2) in FIG. 1. It should be understood that an actual wireless network 10 may have more than two cellular radio transceiver towers and more than two wireless client devices but only two of each are shown in FIG. 1 for simplicity. The cellular radio transceiver towers 20(1) and 20(2) connect to a service provider wireless network infrastructure hub 40 that in turn interfaces to any of a variety of telecommunication service networks, such as the public switched telephone network (PSTN).

In order to improve coverage of the wireless network 10 and to offload some servicing burden of the infrastructure of the wireless network 10, a radio access point (RAP) device 50 is deployed. A single RAP device 50 is shown in FIG. 1, but it should be understood that there may be multiple RAP devices deployed in different locations throughout areas where coverage is desired for the wireless network. Depending on the size and capacity of the RAP device 50, it may be referred to as a "femtocell" access point device, as a picocell access point device, as a nanocell access point device or other trade names. The RAP device 50 connects to a provisioning management server 60 via the Internet 65. The provisioning management server 60 (also referred to herein as a "control server") connects to the service provider wireless network infrastructure hub 40 via the Internet 65 and manages activation of RAP devices 50 in the wireless network 10. Data associated with services that are served by the RAP 50 are routed via the Internet 65 to the service provider wireless network infrastructure hub 40.

RAP devices act as cellular radio transceiver towers in that they operate in licensed spectrum just like the larger and fixed cellular radio transceiver towers 20(1) and 20(2). However, since RAP devices are by their nature movable from one location to another, deployment and service activation of RAP devices involves location verification in order to ensure compliance with regulatory requirements. To this end, each RAP device is equipped with the capability to generate data representing its geographic location in order to verify that the RAP device is operating in a location where it is permitted to do so within the regulatory and service provider requirements.

According to the techniques described herein, a combination of GPS location data and radio environment data are used to verify that a RAP device is at a proper location, and therefore may be activated to service (transmit signals to and receive signals from) wireless client devices, e.g., mobile handsets, of the wireless network 10. GPS satellites are shown at 70(1)-70(K). The RAP device 50 has a GPS receiver and is capable of computing its GPS location on earth from signals received from multiple GPS satellite transmitters. Upon initial activation of the RAP device 50 (and prior to enabling service for the first time), the GPS location data determined by the RAP device 50 is used to first verify that the RAP device is at an acceptable location. If it is determined to be at an acceptable location based on the GPS location data, radio environment data is scanned by the RAP device is then stored for later use as reference radio environment data for subsequent location verification of the RAP device, if necessary. For example, on subsequent reboots of the RAP device 50, radio environment data generated at reboot time is compared against the reference radio environment data to verify the location of the RAP device 50. At reboot, GPS location data is only used if there is a mismatch between the radio environment data obtained at reboot and the reference radio environment data. This avoids the need to perform the more time-consuming GPS location procedure. In addition, periodic or on-demand radio environment data captures are performed for an RAP device in order to adjust or update the reference radio environment data to account for the possible changes in the radio environment around the RAP device. This increases the likelihood that location verification on next reboot will not require use of the GPS procedures.

The location verification process may be collaborative between the RAP device 50 and the control server 60. In the collaborative form of the location verification process, the control server 60 stores reference GPS location data against which the GPS location data obtained by the RAP device 50 at initial activation (and reboot if necessary) is compared. The reference data for GPS may be obtained when device is registered within service provider systems, for example, based on the address were device is expected to be deployed. The control server 60 also stores the reference radio environment data captured by the RAP device 50 for purposes of maintaining a reference or benchmark (i.e., a fingerprint) against which subsequently captured radio environment data from that RAP device is compared (such as in the reboot scenario). The reference radio environment data is only stored if the location of the RAP device 50 was verified using GPS comparison. Also, in the collaborative form, the control server 60 makes the comparisons and sends messages to the RAP device to enable or re-enable service of the RAP device.

However, in another form of the location verification process, the RAP device 50 is configured to enable and re-enable service autonomously. In the autonomous form, the RAP device 50 is configured with and stores the reference GPS location data for comparison against actual GPS location data when the RAP device service is initially activated (or upon reboot if location verification based on radio environment data fails), and to store the reference radio environment data against which subsequently captured radio environment data is compared. Also in the autonomous form, the RAP device 50 determines on its own, without receipt of messages from the control server 60, as to whether it is to be enabled or re-enabled for service depending of the results of location verification made by the RAP device 50. As explained further hereinafter, a RAP device that is configured to operate autonomously may be configured to contact the control server to receive initial provisioning data that includes the reference GPS location data for an expected location of the RAP device and tolerance data that describes a tolerance range within which a match to the reference GPS location and radio environment data is to be declared.

FIGS. 2-8 pertain to the collaborative form of the location verification process and FIGS. 9-12 pertain to the autonomous form of the location verification process.

Figure 2:
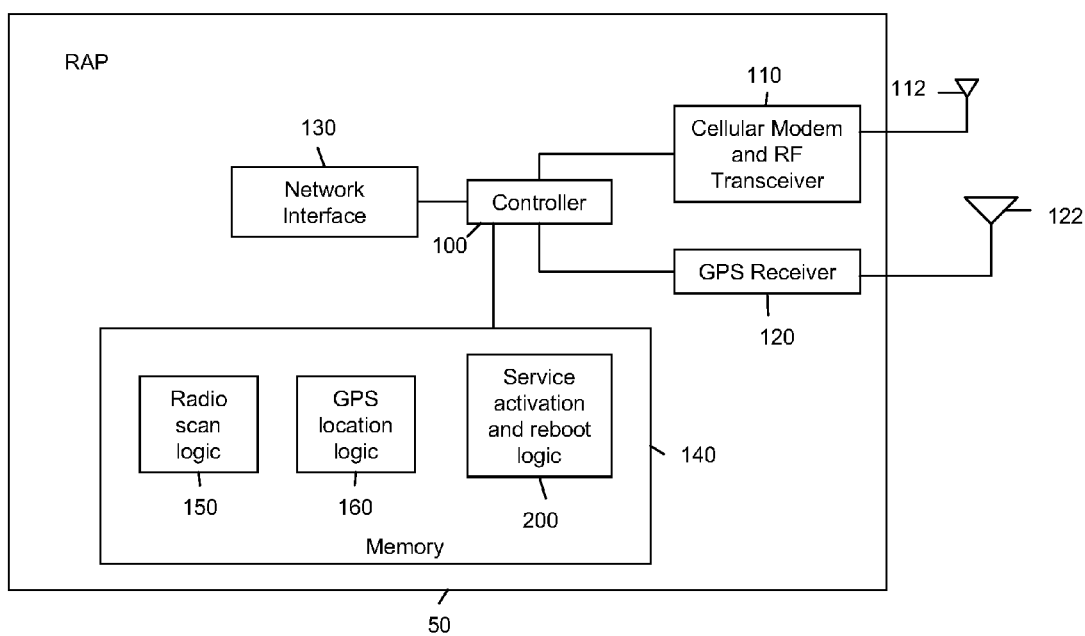
FIG. 2 is an example of a block diagram of a radio access point device that is configured to generate GPS location data and radio environment data that are used in the location verification techniques.

Turning now to FIG. 2, an example block diagram is shown of RAP device 50 that is configured to participate in the collaborative form of the location verification techniques described herein. The RAP device 50 comprises a controller 100 that serves as the primary control component of the RAP device 50. There is a cellular modem and radio frequency (RF) transceiver unit 110 that is configured to perform the baseband and RF signal processing required to transmit and receive over-the-air signals according to a desired wireless communication standard that is employed in the wireless network 10, much like the signals transmitted by the cellular radio transceiver towers 20(1) and 20(2) shown in FIG. 1. The cellular modem and RF transceiver unit 110 transmits signals and receives wireless (RF) signals via the antenna 112 in order to serve wireless client devices operating in the wireless network 10 (FIG. 1). Thus, the RAP device 50 is said to be "enabled" or "re-enabled" for service when it has been configured or commanded to transmit and receive wireless radio signals with respect to wireless client devices operating in the wireless network 10. There is also a GPS receiver 120 that receives signals from GPS satellite transmitters via antenna 122. The controller 100 controls operation of the cellular modem and RF transceiver 110 as well as the GPS receiver 120. A network interface unit 130 is provided that connects to the controller 100 and interfaces the RAP device 50 to a data network, e.g., a local area network, that is in turn connected to the Internet 65.

The controller 100 may, in one example, be a programmable microprocessor or microcontroller, etc., that executes instructions encoded in a processor readable memory medium, e.g., memory 140. To this end, there are instructions encoded or otherwise stored in the memory 140 for radio scan logic 150, GPS location logic 160 and service activation and reboot logic 200 encoded or otherwise stored in the memory 140. The controller 100 executes the radio scan logic 150 in order to control the cellular modem and RF transceiver 110 to perform a scan at one or more specified channels in order to generate radio environment data from received wireless signals at the one or more specified channels of interest. Examples of the information contained in the radio environment data are described hereinafter. Similarly, the controller 100 executes the GPS location logic 160 to control the GPS receiver 120 to receive signals from GPS satellite transmitters and to compute GPS location data representing a location of the RAP device 50 on earth. The GPS location data may comprise latitude/longitude coordinate data.

Under control of the radio scan logic 150, the controller 100 controls the cellular modem and RF transceiver 110 during a radio scan event to extract data from received RF signals, e.g., received cellular signals, and to make measurements of the received signal power, etc., for use in constructing a "fingerprint" of the radio environment data to be used as a reference. The controller 100 executes the service activation and reboot logic 200 when the RAP device 50 is initially powered up, is shut down and subsequently rebooted (after initial service activation) and during normal service to update the radio environment data. In the course of execution the service activation and reboot logic 200, the controller 100 also executes the radio scan logic 150 and/or the GPS location logic 160. The service activation and reboot logic 200 is described in further detail hereinafter in conjunction with FIGS. 4 and 5.

Figure 3:
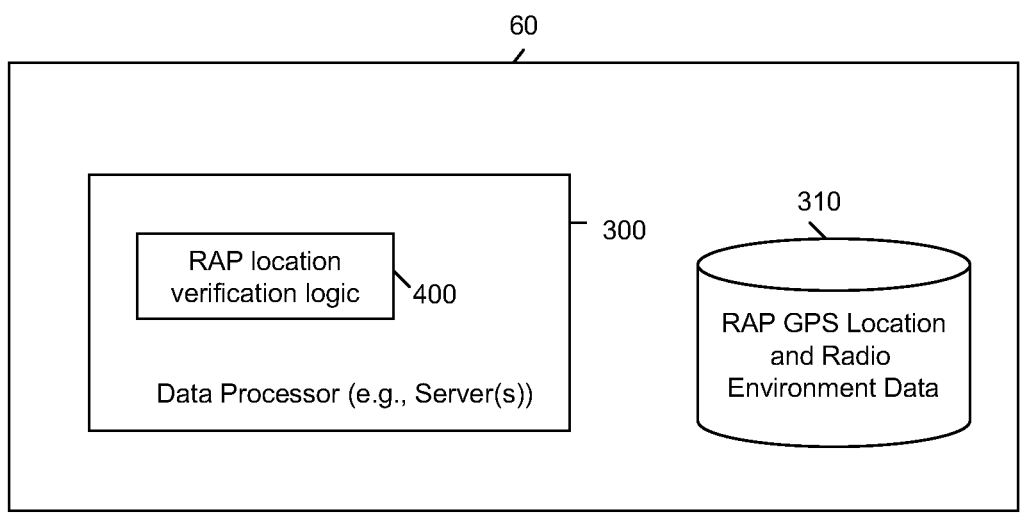
FIG. 3 is an example of a block diagram of a control server that is configured to perform location verification of radio access point devices.

Turning now to FIG. 3, an example of a block diagram of the control server 60 is described. The control server 60 may comprise one or more server computers equipped with software to perform a variety of management functions for RAP devices. One such management function is to control service activation of RAP devices by first verifying that they are located where they should be located and thus permitted to transmit RF signals within a certain geographical area where they should be located. In the collaborative form of the techniques described herein, the control server 60 is equipped to communicate with RAP devices to verify their locations before enabling them for service and for re-enabling RAP devices for service upon reboot as necessary. The control server 60 comprises a data processor 300 (e.g., one or more server computers) that stores and executes RAP location verification logic 400. The control server 60 may comprise a data storage device 310 that stores the reference GPS location data and reference radio environment data for each RAP device that the control server 60 is responsible to manage in the wireless network 10.

Figure 4:
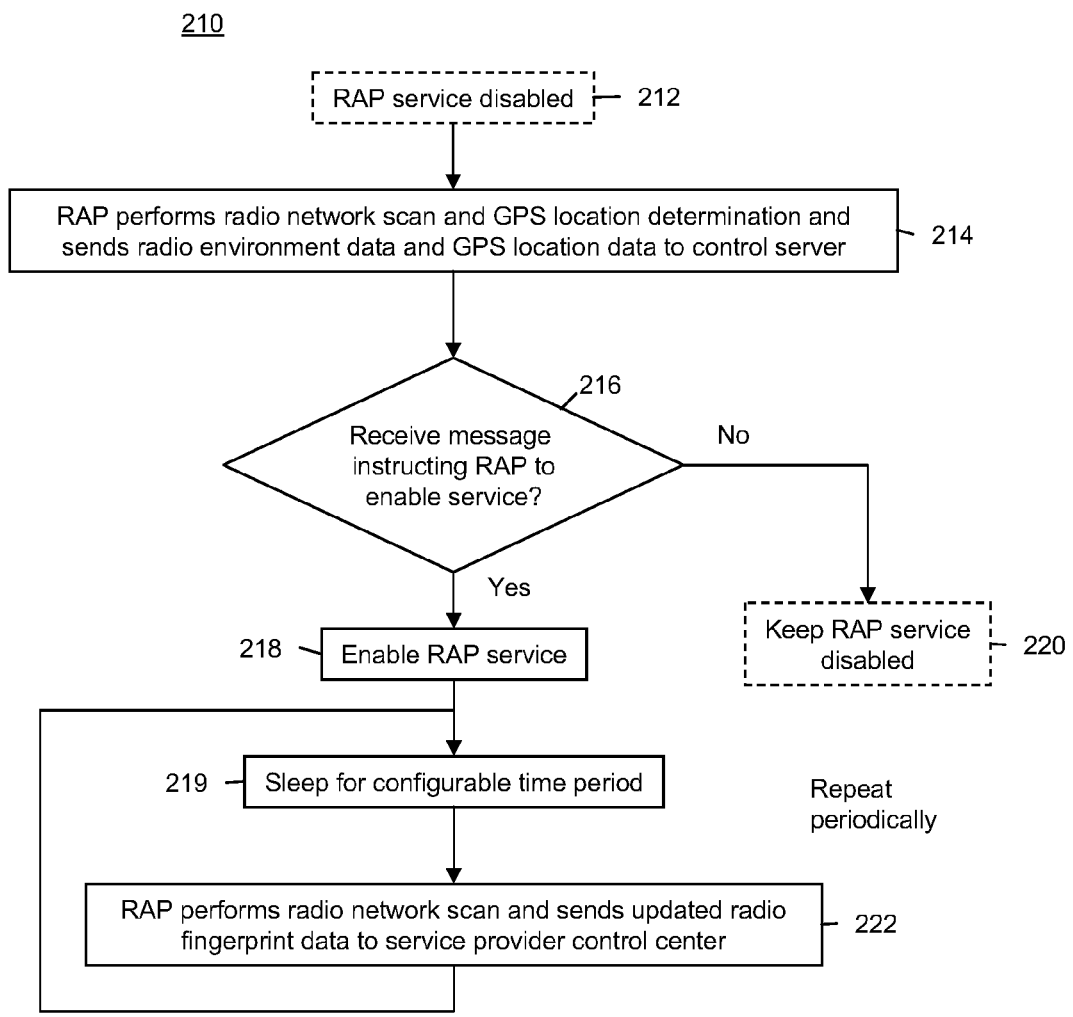
FIGS. 4 and 5 illustrate examples of flow charts for logic that is executed in the radio access point device that is configured to participate in the location verification techniques described herein.
Figure 5:
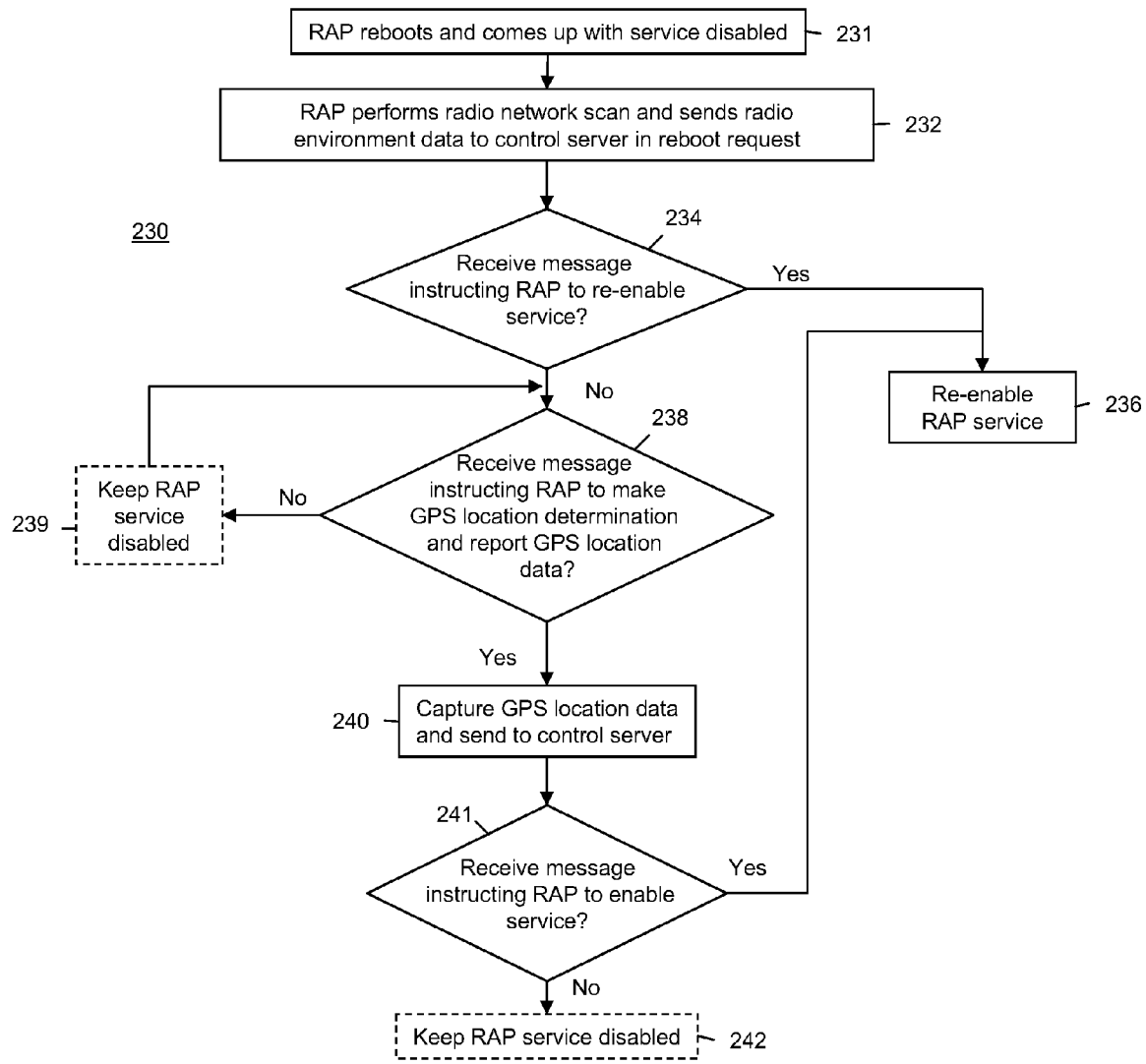

With reference now to FIGS. 4 and 5, the service activation and reboot logic 200 is described. For simplicity, the logic 200 is separated into two components, logic 210 and logic 230. FIG. 4 is a flow chart for logic 210 and FIG. 5 is a flow chart for logic 230. The logic 210 pertains to the functions in the RAP device 50 for initial service activation of the RAP device and subsequent updating of the radio environment data after initial service activation. The logic 230 pertains to the functions in the RAP device 50 that are performed when the RAP device is rebooted from a shutdown mode at some time after initial service activation. There are a variety of reasons why the RAP device may have to be rebooted, such as power failure, software failure and repair, hardware failure and repair, etc.

Referring first to FIG. 4, with reference also to FIGS. 1 and 2, the logic 210 is described. The logic 210 begins at 212 with the assumption that the RAP device is not yet activated for service. For example, the RAP device is about to be installed by a user at a user site. When a user powers up the RAP device, the controller 100 recognizes that it has not yet been activated and enabled for service by the control server 60. Therefore, at 214, the controller 100 invokes the radio scan logic 150 to perform a radio network scan of RF signals and invokes the GPS location logic 160 to receive GPS signals and determine the GPS location of the RAP device. In a variation of the above, the control server 60, in response to receiving a simple boot notification message from the RAP device 50, may send a message to the RAP device 50 instructing it to perform the initial GPS location computation and radio network scan. Once the RAP device performs the radio network scan and generates radio environment data and generates GPS location data, it sends this data to the control server 60.

The radio environment data may comprise one or more pieces of information concerning the RF environment in the vicinity of the RAP device 50. For example, the radio environment data may comprise an identifier (ID) of one or more cellular radio transceiver towers which transmit within the vicinity of RAP (e.g., ID of cellular radio transceiver tower 20(1) and/or 20(2) shown in FIG. 1) also known as a neighbor cell ID, ID of one or more nearby RAP devices, a so-called "country code" extracted from a received cellular signal from a nearby radio transceiver tower, a so-called "network code" from a received cellular signal from a nearby radio transceiver tower or from a mobile handset device, and frequency of each of one or more cellular signals received from a nearby radio transceiver tower, etc. In addition, the radio environment data may include one or more of a scrambling code of a received cellular signal, a regional network controller ID for a cellular radio transceiver, a received power of a signal from a cellular radio transceiver, an indication of transmitted power level for a signal transmitted by a cellular radio transceiver, and transmission power loss derived from a difference between transmitted signal power and received signal power of a cellular signal from a cellular transceiver tower. The transmitted power of a cellular signal may be encoded in a field of the cellular signal. As explained above, the cellular modem and RF transceiver 110 extracts from received wireless signals data that is useful for the radio environment data and also makes measurements on received signals that are useful for the radio environment data. Below is a table that lists an example of radio environment data that a RAP device may produce. It is to be understood, however, that the structure of the radio environment data is flexible and can accommodate unique wireless network service provider requirements.

TABLE 1

Example of Radio Environment Data

| Neighbor transmitter | Cell ID | Country Code | Network Code | Frequency Channel | Receive power strength |
|---|---|---|---|---|---|
| #1 | 45678 | 310 | 234 | 256 | −50 dBm |
| #2 | 34561 | 310 | 235 | 9257 | −58 dBm |
| #3 | 12678 | 310 | 356 | 258 | −62 dBm |

The control server 60 receives the GPS location data and the radio environment data from the RAP device and performs location verification to determine whether or not to enable service the RAP device. The process of location verification is described hereinafter in conjunction with FIG. 6. Generally, when the control server 60 determines that the RAP device is at a location where it is permitted to operate, it sends, via the Internet, a message to the RAP device instructing the RAP to enable service. Thus, at 216, when the RAP device receives the message instructing it to enable service, the RAP enables service at 218. If the RAP device does not receive this message from the control server 60, the RAP device is kept in a service disabled state as indicated at 220 and may at a later point obtain new radio environment and GPS data and attempt to get activation authorization from the control server 60 again.

When the RAP device 50 is enabled for service at 218, the logic 210 essentially goes to sleep for a configurable period of time as indicated at 219 before performing an updated radio network scan. Alternatively, the control server 60 may send a message to the RAP device 50 commanding it to perform a new radio network scan. The purpose of performing the updated radio network scan is to update the radio environment data from time to time to account for possible changes in the RF environment surrounding the RAP device 50. At 222, the controller 100 in the RAP device invokes the radio scan logic 150 to perform a radio network scan of RF signals and generates updated radio environment data that is then sent to the control server 60 to update the reference radio environment data maintained at the control server 60 (if necessary) for the RAP device 50. This process of updating the radio environment data, represented by the functions 219 and 222, is repeated periodically as indicated by the loop back from 222 to 219 in FIG. 4, or on demand.

In one variation to the logic 210, when the RAP device 50 generates the radio environment data, it may be configured to generate "raw" data associated with signals received by the cellular modem and RF transceiver 110, and to send this "raw" data to the control server 60. The control server 60 then processes the "raw" data to generate the radio environment data fingerprint for the radio environment data using pieces of the raw data that are deemed to be relevant.

In another variation to the process logic 210 shown in FIG. 4, it may be desirable to periodically repeat the location verification functions shown at 214-220 even after service has been enabled for the RAP device 50. This would serve as additional location verifications that may be desired by the service provider even after service is initially enabled at the RAP device 50. If at one of these periodic location verification tests it is determined that location verification fails, then service of the RAP device 50 is disabled. Further still, prior to initial service enablement of the RAP device 50, the functions 214-220 may be repeated periodically until service for the RAP device 50 is eventually initially enabled.

Turning to FIG. 5, with reference also to FIGS. 1 and 2, the logic 230 is now described. The logic 230 is configured to achieve location verification of the RAP device 50 when, after initial activation, it is rebooted. As indicated at 231, when rebooted the RAP device 50 starts up with service disabled in order to enable location verification to take place first. For example, the RAP device 50 may have been moved while it was powered down. At 232, when the RAP device 50 is rebooted (powered-up again), the controller 100 is configured to recognize the reboot operation and to invoke the radio scan logic 150 to perform a radio network scan in order to generate radio environment data and to send the radio environment data to the control server 60 in a reboot request message. Alternatively, the RAP device 50 may simply contact the control server 60 upon reboot notifying it of reboot and the control server 60 may instruct the RAP device to perform the radio scan. Once the control server 60 receives radio environment data from the RAP device, the control server 60 verifies the location of the RAP device by comparing the radio environment data with the stored reference radio environment data to determine whether there is a substantial match. Thus, at 234, if the RAP device receives a message instructing it to re-enable service, then the RAP device re-enables service at 236 and can resume serving wireless client devices in the wireless network 10.

When the RAP device does not receive a message commanding it to re-enable service, then at 238, the controller 100 waits to receive a message from the control server 60 that commands it to perform a GPS location determination to generate GPS location data. Until such a command message is received, the RAP device 50 is kept disabled as indicated at 239. When the RAP device 50 receives the message to capture GPS location data, at 240 the controller 100 in the RAP device invokes the GPS location logic to generate GPS location data and sends the GPS location data to the control server 60. In a variation, the GPS location function at 240 may be invoked automatically by the RAP device 50 when it does not receive a message instructing it to re-enable service based on radio environment data. The control server 60 compares the GPS location data with the reference GPS location data for the RAP device 50 and if they substantially match, sends a control message to the RAP device 50 to re-enable service. At 241, the controller 100 waits for and responds to the message from the control server 60 to re-enable service, and at 236, re-enables RAP service. Otherwise, RAP service is kept disabled as indicated at 242, in which case the reactivation process described in FIG. 5 may be repeated at a later point in time.

Figure 6:
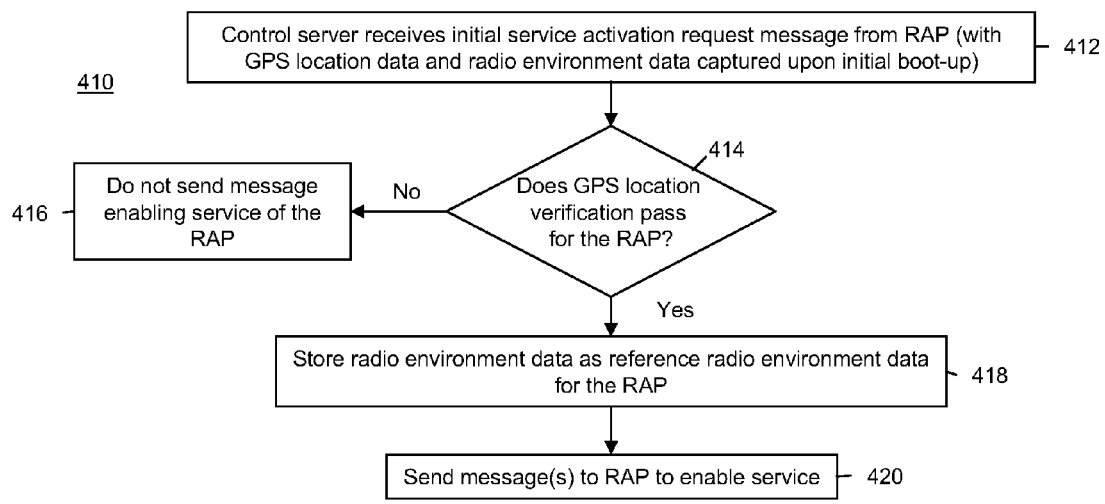
FIGS. 6-8 illustrate examples of flow charts for logic that is executed in the control server that is configured to perform the location verification techniques described herein.
Figure 7:
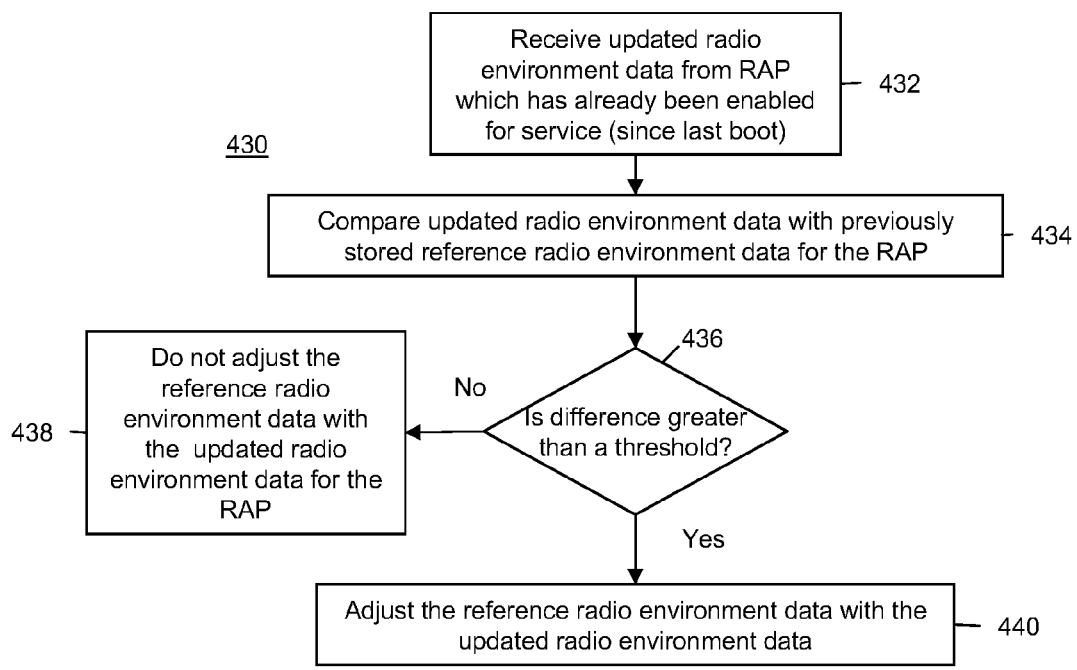
Figure 8:
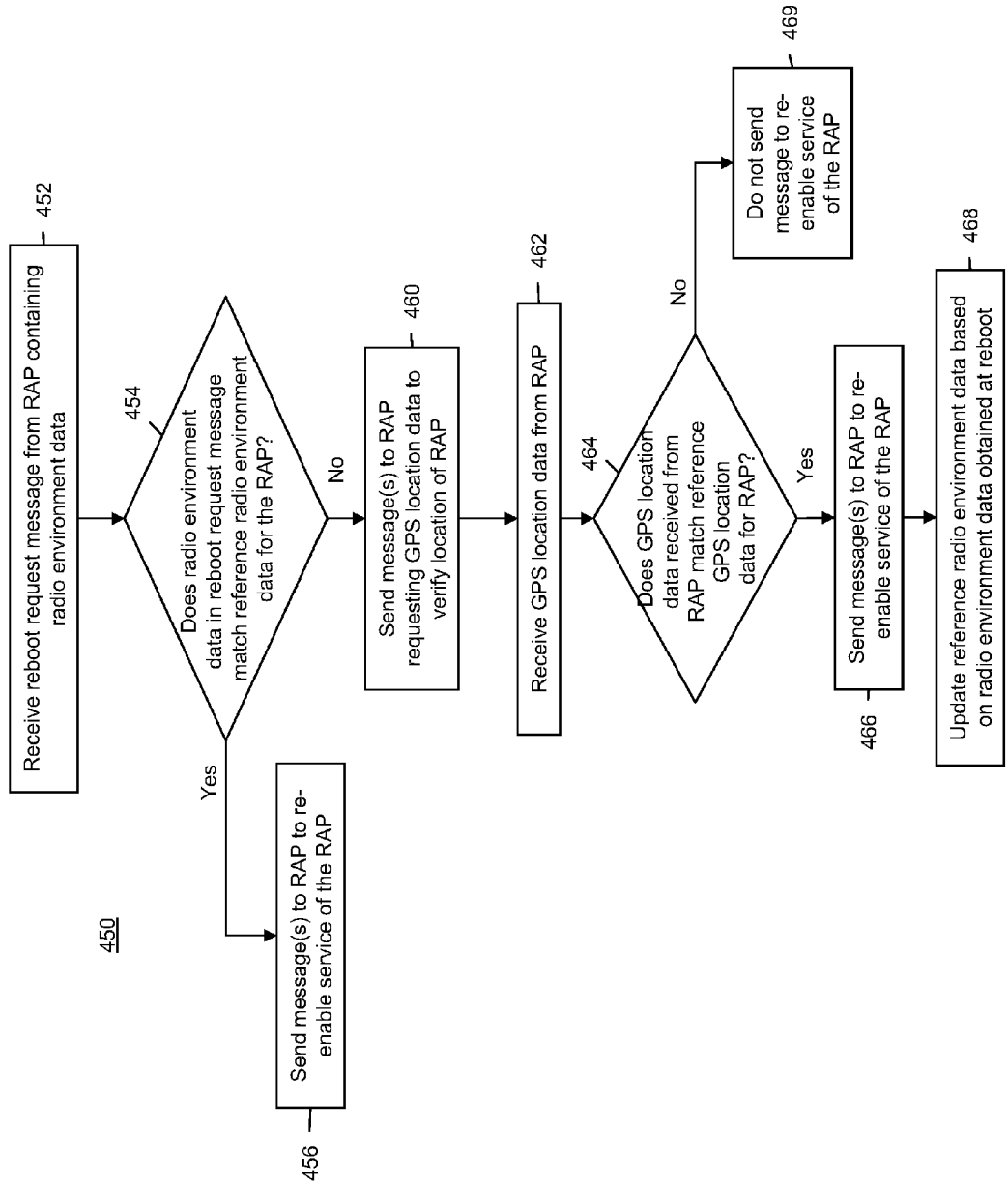

Reference is now made to FIGS. 6-8 for a description of the RAP location verification logic 400 in the control server 60. For simplicity, the RAP location verification logic 400 is separated into three logic components: logic 410 for location verification for initial service activation of a RAP device, logic 430 for storing updated radio environment data, and logic 450 for location verification at reboot (RAP service re-enablement).

Referring first to FIG. 6, with reference also to FIGS. 1 and 3, the logic 410 for location verification upon initial service activation of an RAP device is now described. At 412, the control server 60 receives an initial service activation request message from a RAP device and the initial service activation request message comprises GPS location data captured by the RAP device and radio environment data captured upon initial power up of the RAP device. Alternatively, control server 60 receives a message with boot notification from the RAP device 50, recognizes that this is initial activation and sends a control message to RAP device to request radio environment and GPS data. At 414, the control server 60 compares the GPS location data with stored reference GPS location data for the RAP device that is requesting activation. The stored reference GPS location data may be determined from an expected location of the RAP device when it was sold or distributed to a user or customer, such as from an expected location determined based on user/subscriber registration data (such as a postal address).

When it is determined that the GPS location data captured by the RAP device substantially matches the reference GPS location data, then location verification is said to have passed, and at 418 the control server 60 stores the radio environment data as reference radio fingerprint data for that RAP device. At 420, the control server 60 sends a message to the RAP device to enable service of the RAP device. When used herein, "substantially or sufficiently match" is meant to include a complete match as well as a match within a specified or configurable tolerance range. The degree to which GPS location must match can be controlled via administrative configuration made at the control server 60. As indicated at 416, the control server 60 does not send a message enabling service of the RAP device when the GPS location data comparison fails at 414.

Thus, at 418, the control server 60 stores data for each RAP that passes location verification upon initial activation. Table 2 below shows examples of data stored at the control server 60 for RAP device assigned identifier 3576421 and for RAP device assigned identifier 7745531.

TABLE 2

| RAP Location and Radio environment data | |
| --- | --- |
| RAP ID | 3576421 |
| Reference (Expected) GPS Location Data | Latitude: 45'56"32 N Longitude: 33'23"12 W |
| Reference Radio Environment Data | Neighbor Cell ID: 34564 Receive Power: −98 dBm Neighbor Cell ID: 44321 Receive Power: −63 dBm |
| RAP ID | 7745531 |
| Reference (Expected) GPS Location Data | Latitude: 15'66"12 N Longitude: 26'23"55 W |
| Reference Radio Environment Data | Neighbor Cell ID: 24364 Receive Power: −82 dBm Neighbor Cell ID: 14121 Receive Power: −45 dBm |

Turning to FIG. 7, again with continued reference to FIGS. 1 and 3, the logic 430 for storing updated radio environment data is now described. This logic 430 is invoked when a RAP device captures updated radio environment data. As explained above, a RAP device may be configured to periodically capture updated radio environment data or the control server 60 may command the RAP device to capture updated radio environment data. At 432, the control server 60 receives updated radio environment data from a RAP device that has already been enabled for service. At 434, the control server 60 determines which RAP has sent updated radio environment data (based on a RAP identifier contained in the message with the updated radio environment data) and compares the updated radio environment data with previously stored reference radio environment data for that particular RAP. At 436, when it is determined that the difference between the updated radio environment data and the previously stored reference radio environment data is less than a threshold, then the reference radio environment data is not adjusted with the updated radio environment data. On the other hand, when the difference is greater than a threshold, then at 440 the updated radio environment data is used to adjust the reference radio environment data. The existing reference radio environment data may be adjusted by a complete overwrite with the updated radio environment data, by adding new pieces of information in the updated radio environment data that that are not contained in the reference radio environment data or by changing one or more pieces of information in the reference radio environment data with data in the updated radio environment data. In this way, when there are substantial enough changes in the RF environment of an RAP device, the corresponding changes in the radio environment data can be reflected in the reference radio environment data so that future location verification of the RAP device can take these changes into account. Said another way, the reference radio environment data is adjusted based on the updated radio environment data depending on a difference between the updated radio environment data and the reference radio environment data. The reference data need not be updated every time it is reported from an activated RAP device with verified location. However, in one form it may be desirable to bypass the check at 436 and update the reference environment data regardless of the degree of difference between the updated radio environment data and the current reference environment data. Thus, the functions at 434 and 436 are optional and the logic may go directly from 432 to 440.

Turning now to FIG. 8, the logic 450 in the control server dedicated to location verification for reboot and service re-enablement is now described. At 452, the control server 60 receives a reboot request message from a RAP device containing radio environment data captured by the RAP device at the time of reboot. Alternatively, the request may not contain radio environment data and control server 60 may send a control message to RAP device to request this data. At 454, the control server compares the radio environment data in the reboot request message with the reference radio environment data for the RAP device and when there is a substantial match at 456, the control server 60 sends a message to the RAP device to re-enable service of the RAP so that it can resume serving wireless client devices in the wireless network. Again, "substantial match" as used herein in connection with the comparison between captured radio environment data at reboot and the reference radio environment data is meant to include a complete match as well as a match within a certain tolerance range. Moreover, a partial match between the radio environment data at reboot with the reference radio environment is also possible. For example, a change in received power strength from neighbor cellular towers can be approximately translated into a distance traveled by the RAP device since the last reference was obtained. A comparison of radio environment data can allow a certain range of receive power variation (e.g. 6 dBm) from the prior benchmark (reference environment data). Thus, the comparison of the radio environment data at reboot with the reference radio environment data may involve comparing a portion of the radio environment data generated at reboot with a corresponding portion of the reference radio environment data.

Otherwise, when there is not a match at 454, the control server 60 does not send a message to re-enable operation of the RAP device and at 460, the control server 60 sends a message to the RAP requesting it to capture GPS location data. At 462, the control server 60 receives a message from the RAP device 50 containing the GPS location data. At 464, the control server 60 compares the GPS location data received from the RAP device with the reference GPS location data for that RAP device. When there is a substantial match, at 466 the control server 60 sends a message to the RAP device to re-enable its operation. Then, at 468, the control server 60 updates the reference radio environment data based on the radio environment data obtained by the RAP at reboot. When at 464 it is determined that the GPS location data received from the RAP device and the reference GPS location data do not substantially match, then the control server 60 does not send a message re-enabling operation of the RAP device as indicated at 469.

Figure 9:
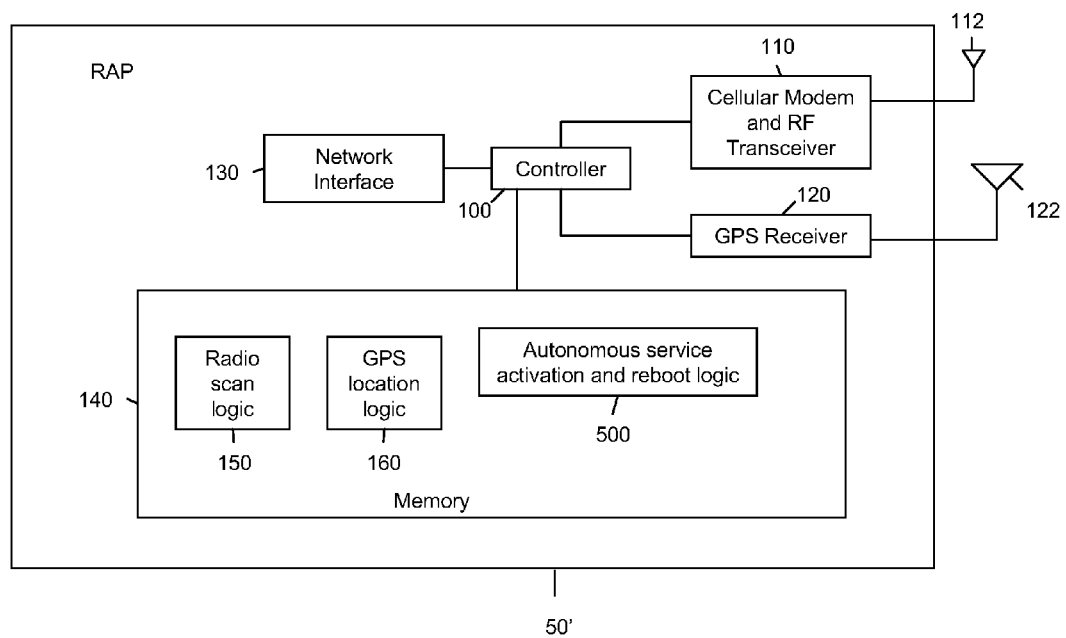
FIG. 9 is an example of a block diagram of a radio access point device that is configured to generate GPS location data and radio environment data and to autonomously perform the location verification techniques described herein.

Referring now to FIG. 9, a RAP device 50' is shown that is configured to autonomously perform location verification according to the techniques described herein. The RAP device 50' does this autonomously because, except for acquiring basic provisioning data, it does not need to interact with the control server 60 to enable or re-enable service. The RAP device 50' is similar to RAP device 50 shown in FIG. 2, except that it has autonomous service activation and reboot logic 500 instead of logic 200 shown in FIG. 2 for RAP device 50. For simplicity, the autonomous service activation and reboot logic 500 is broken down into three components: initial service activation and location verification logic 510, radio environment data update logic 530 and reboot re-enablement and location verification logic 550.

Figure 10:
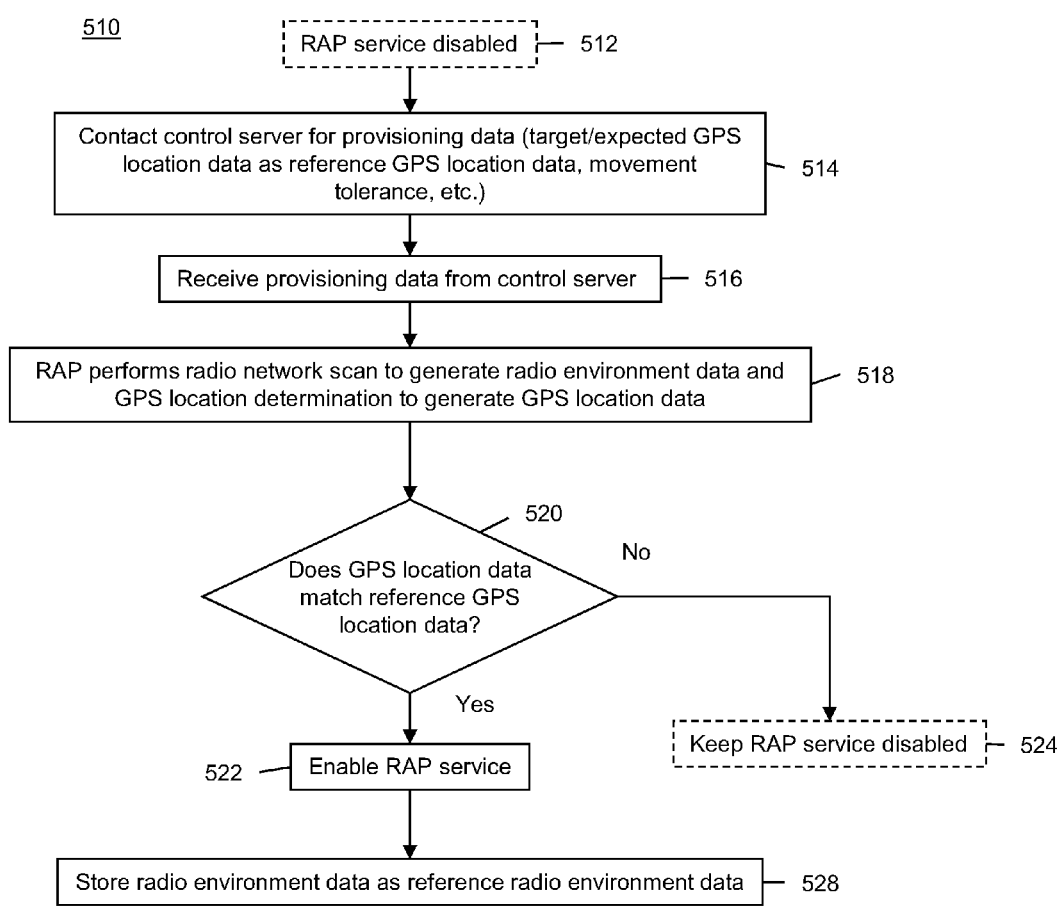
FIGS. 10-12 are examples of flow charts for logic executed in the radio access point device that is configured to autonomously perform the location verification techniques described herein.

Referring to FIG. 10, with reference also to FIG. 9, the initial activation and location verification logic 510 is described. The RAP device 50' is assumed to be in a service disabled state as shown at 512. In one form, when the RAP device 50' is powered up, at 514 it sends a message to the control server 60 requesting provisioning data to allow the RAP device 50' to perform location verification for initial service enablement and after subsequent reboots. The provisioning data may comprise reference GPS location data for an expected location of the RAP device 50' and tolerance data that describes a tolerance range within with a match to the reference GPS and/or radio environment location data is to be declared. The memory 140 of the RAP device 50' stores the reference GPS location data and tolerance settings. At 516, the RAP device 50' receives the provisioning data from the control server 60. At 518, the RAP device 50' invokes the radio scan logic 150 to generate radio environment data and invokes the GPS location logic 160 to compute GPS location data from received GPS signals. At 520, the controller compares the GPS location data captured at 518 with the reference GPS location data to determine whether there is a substantial match, and if so, then at 522 the controller enables service of the RAP device 50'. Otherwise, when GPS location data captured at 518 does not substantially match the reference GPS location data, service of the RAP device 50' is kept disabled as indicated a 524.

At 526, the controller 100 stores in the memory 140 the radio environment data generated at 518 as reference radio environment data to be used for future location verification purposes, e.g., at reboot, as described hereinafter.

Table 3 below shows an example of the data that would be stored in RAP device 50'.

TABLE 3

GPS Location Data and Radio Environment Data Stored in Autonomous RAP

| | |
|---|---|
| Reference (Expected) GPS Location Data | Latitude: 45'56"32 N |
| | Longitude: 33'23"12 W |
| GPS Tolerance Radius | 1000 meters |
| Reference Radio Environment Data | Neighbor Cell ID: 34564 |
| | Receive Power: −98 dBm |
| | Neighbor Cell ID: 44321 |
| | Receive Power: −63 dBm |
| Radio Environment Data Power Variance Tolerance | 6 dBm |

As explained above in connection with FIG. 4, it may also be desirable to periodically repeat the location verification functions shown at 514-522 even after service has been enabled for the RAP device 50'. This would serve as additional location verifications that may be desired by the service provider. If at one of these periodic location verification tests it is determined that location verification fails, then service of the RAP device 50' is disabled. Further still, prior to initial service enablement of the RAP device 50', the functions 514-522 may be repeated periodically until service for the RAP device 50' is eventually initially enabled.

Figure 11:
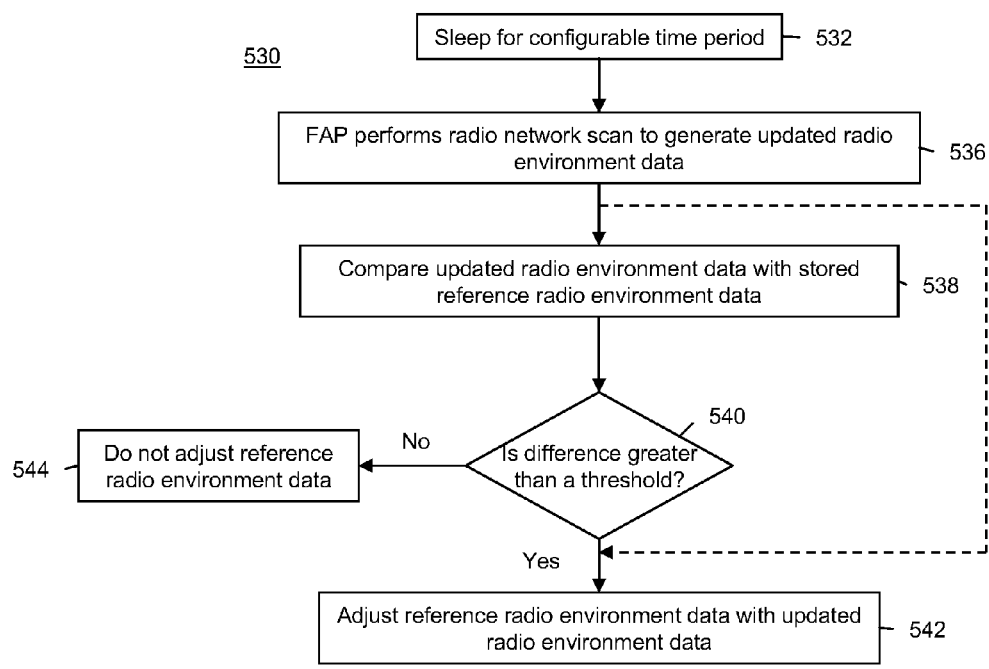

Turning now to FIG. 11 with reference to FIG. 9, the radio environment data update logic 530 is described. After the RAP device 50' is enabled for service, the logic 530 is put into a sleep mode for a configurable time period as indicated at 532. At 536, the RAP performs a radio network scan to generate updated radio environment data. At 538, the controller 100 compares the updated radio environment data with the stored reference radio environment data. At 540, the difference between the updated radio environment data and the reference radio environment data is compared with a threshold. When the difference is greater than the threshold, then at 542 the updated radio environment data is adjusted (either by overwriting with the updated radio environment data, adding new pieces of information or changing existing information) for location verification in the future. When the difference is not greater than the threshold, then as indicated at 544, the reference radio environment data is not adjusted with the updated radio environment data. That is, the controller 100 in RAP device 50' adjusts the reference radio environment data based on the updated radio environment data depending on a difference between the updated radio environment data and the reference radio environment data. The process of updating the radio environment data may be repeated periodically. Alternatively, the RAP device 50' always stores the updated radio environment data as indicated by the dotted arrow from 536 to 542 in FIG. 11.

Figure 12:
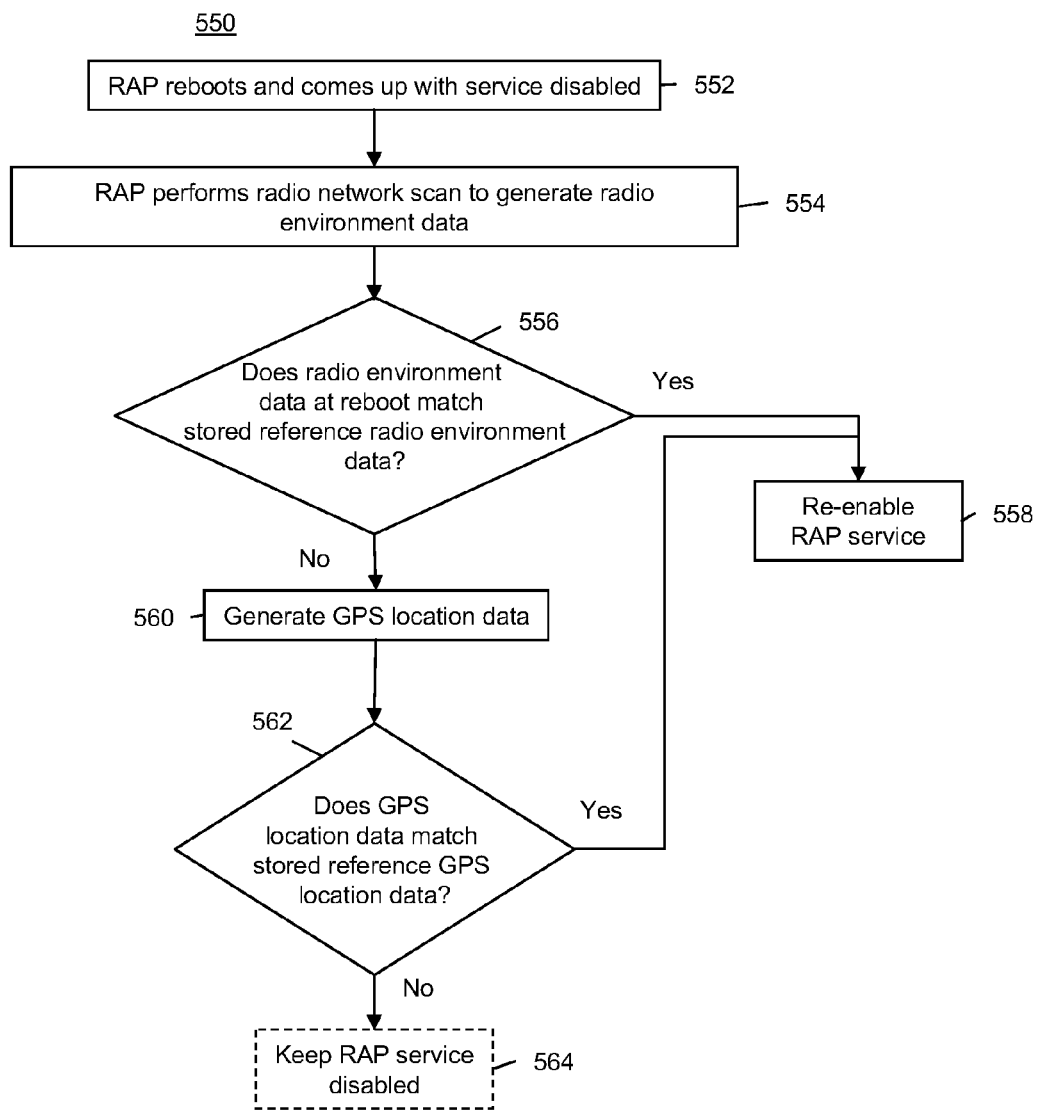

Reference is now made to FIG. 12, with continued reference to FIG. 9, for a description of the reboot location verification logic 550. The controller 100 in the RAP device 50' invokes the reboot location verification logic 550 when the RAP device 50' has shut down and needs to reboot. After reboot, the RAP device 50' powers up with service disabled because location verification of the RAP device 50' must be made before allowing it to begin transmitting RF signals as indicated at 552. Upon reboot, the controller 100 invokes the radio scan logic 150 to perform a radio network scan and to generate radio environment data. At 556, the controller 100 compares the radio environment data generated at reboot with the stored reference radio environment data to determine whether they sufficiently match. When a match is determined at 556, then at 558 the controller 100 re-enables service of the RAP device 50'. In addition, the controller 100 may update the reference radio environment data with the radio environment data obtained by the RAP device 50' at reboot.

On the other hand, when a match is not found at 556, then at 560, the controller 100 invokes the GPS location logic to generate GPS location data from received GPS signals. At 562, the controller 100 compares the GPS location data with the stored reference GPS location data. When a match is found at 562, the controller re-enables service of the RAP device 50' at 558. Otherwise, the controller 100 keeps service of the RAP device 50' disabled as indicated at 564 and attempt to perform the logic depicted in FIG. 12 again at a later time.

Thus, the autonomous RAP device 50' can perform location verification on its own at initial service activation and also at reboot to enable or re-enable, as the case may be, service of the RAP device 50'. When the RAP device 50' stores data for later comparison, it should be understood that such data storage is made into memory that persists after reboot, i.e., non-volatile memory.

While the foregoing description refers to verifying the location of an RAP device for purposes of enabling or re-enabling service of the RAP device, this is not meant to be limiting. Another application of the location information is to determine and assign to the RAP device parameters which may be unique to a specific location, such as the frequency on which it is to transmit wireless signals for serving mobile communication handsets in the wireless communication network. Thus, after the location of the RAP device is verified, the control server 60 (FIG. 1) may transmit a message indicating the frequency on which the RAP device should transmit in the wireless network based on the location of the RAP device. Still another application may involve configuring the RAP device with a list of candidate parameters for it to choose depending on specific location. For example, more than one potential frequency of operation may be provided to RAP. The RAP device would then configure itself to use a particular frequency that depends on where it is located, and only after verifying its location.

The collaborative and autonomous version of the location verification process described herein both have the advantage of reducing reliance on GPS location procedures. The radio network scan is configured to finish in a predictable amount of time and usually much faster and more reliably than it would take to obtain a GPS lock and produce GPS location data. Unlike GPS, the radio network scan does not depend on reasonable line-of-sight to the sky. Therefore, the radio environment data can be used as a shortcut for location verification once the GPS location coordinates have been initially verified. The radio environment data is stored for future location verification. Use of the radio network scan in this manner reduces reliance on GPS for location verification of the RAP device. However, GPS may still be needed during reboot if there is a substantial radio environment data mismatch and in other scenarios as the ultimate authority on absolute position of RAP device.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
at a radio access point device:
receiving signals from global positioning system (GPS) satellite transmitters to produce GPS location data representing a GPS location of the radio access point device;
receiving wireless signals in one or more specified channels and generating radio environment data representing characteristics of received wireless signals in the one or more specified channels;
comparing the GPS location data with reference GPS location data for an expected location of the radio access point device;
verifying that the radio access point device is at an acceptable location when results of the comparing indicate that the GPS location data substantially matches the reference GPS location data;
when the GPS location data does not substantially match the reference GPS location data, disabling service of the radio access point device such that when the radio access point device is subsequently rebooted, the radio access point device subsequently boots up with service disabled;
receiving additional wireless signals to generate additional radio environment data;
comparing the additional radio environment data with reference radio environment data; and
re-enabling service of the radio access point device when the additional radio environment data substantially matches the reference radio environment data.

2. The method of claim 1, further comprising updating the reference radio environment data based on the additional radio environment data.

3. The method of claim 2, further comprising a period of time after service of the radio access point device is re-enabled, generating updated radio environment data on a periodic basis based on further received wireless signals.

4. The method of claim 2, further comprising a period of time after service of the radio access point device is re-enabled, generating updated radio environment data based on further received wireless signals in response to a command from a control server.

5. The method of claim 1, further comprising a period of time after re-enabling service of the radio access point device, receiving further wireless signals to generate updated radio environment data, and adjusting the reference radio environment data based on the updated radio environment data.

6. The method of claim 1, wherein the radio environment data and the reference radio environment data comprise: an identifier of a cellular radio transceiver that services a cell, a country code from a cellular signal, a network code from the cellular signal or another cellular signal, a frequency of the cellular signal or the other cellular signal, and a received power of a signal from the cellular radio transceiver.

7. The method of claim 1, wherein comparing the additional radio environment data with the reference radio environment data comprises comparing a portion of the additional radio environment data generated at reboot of the radio access point device with a corresponding portion of the reference radio environment data.

8. The method of claim 1, further comprising receiving provisioning data from a control server, wherein the provisioning data includes the reference GPS location data for an expected location of the radio access point device and tolerance data that describes a tolerance range within which a match to the reference GPS location and/or the radio environment data is to be declared.

9. The method of claim 1, further comprising periodically repeating receiving the signals from the GPS satellite transmitters, receiving the wireless signals in the one or more specified channels and generating the radio environment data, and comparing the GPS location data with the reference GPS location data in order to perform additional location verifications even after service is enabled at the radio access point device.

10. The method of claim 1, further comprising periodically repeating receiving the signals from the GPS satellite transmitters, receiving the wireless signals in the one or more specified channels and generating the radio environment data, and comparing the GPS location data with the reference GPS location data until service for the radio access point device is eventually initially enabled.

11. A radio access point device comprising:
a radio transceiver unit configured to transmit and receive wireless signals associated with a wireless communication network to serve wireless mobile communication devices that operate in the wireless communication network, wherein the radio transceiver unit is configured to receive the wireless signals at one or more channels to generate radio environment data representing characteristics of received wireless signals at the one or more channels;
a global positioning system (GPS) receiver unit configured to receive GPS signals from multiple satellite transmitters and to compute GPS location data representing a GPS location from the GPS signals; and
a controller configured to connect to the radio transceiver unit and to the GPS receiver unit, wherein the controller is configured to:
generate radio environment data representing characteristics of the received wireless signals at the one or more channels;
compare the GPS location data with reference GPS location data for an expected location of the radio access point device;
verify that the radio access point device is at an acceptable location when results of the comparing indicate that the GPS location data substantially matches the reference GPS location data;
when the GPS location data does not substantially match the reference GPS location data, disable service of the radio access point device such that when the radio access point device is subsequently rebooted, the radio access point device subsequently boots up with service disabled;
generate additional radio environment data based on additional wireless signals received by the radio transceiver unit;
compare the additional radio environment data with reference radio environment data; and
re-enable service of the radio access point device when the additional radio environment data substantially matches the reference radio environment data.

12. The radio access point device of claim 11, wherein the controller is further configured to update the reference radio environment data based on the additional radio environment data.

13. The radio access point device of claim 11, wherein a period of time after re-enabling service of the radio access point device, the controller is configured to generate updated radio environment data, and adjust the reference radio environment data based on the updated radio environment data.

14. The radio access point device of claim 11, wherein the radio environment data and the reference radio environment data comprise: an identifier of a cellular radio transceiver that services a cell, a country code from a cellular signal, a network code from the cellular signal or another cellular signal, a frequency of the cellular signal or the other cellular signal, and a received power of a signal from the cellular radio transceiver.

15. The radio access point device of claim 11, wherein the controller is configured to compare the additional radio environment data with the reference radio environment data by comparing a portion of the additional radio environment data generated at reboot of the radio access point device with a corresponding portion of the reference radio environment data.

16. The radio access point device of claim 11, wherein the controller is further configured to receive provisioning data from a control server, wherein the provisioning data includes the reference GPS location data for an expected location of the radio access point device and tolerance data that describes a tolerance range within which a match to the reference GPS location and/or the radio environment data is to be declared.

17. One or more non-transitory tangible computer readable storage media encoded with instructions for execution and when executed by a processor in a radio access point device, the processor is operable to:
generate global positioning system (GPS) location data from signals received from satellite transmitters, the GPS location data representing a GPS location of the radio access point device;
generate radio environment data representing characteristics of received wireless signals by the radio access point device in one or more channels;
compare the GPS location data with reference GPS location data for an expected location of the radio access point device;
verify that the radio access point device is at an acceptable location when results of the comparing indicate that the GPS location data substantially matches the reference GPS location data;
when the GPS location data does not substantially match the reference GPS location data, disable service of the radio access point device such that when the radio access point device is subsequently rebooted, the radio access point device boots up with service disabled;
generate additional radio environment data based on received additional wireless signals;
compare the additional radio environment data with reference radio environment data; and
re-enable service of the radio access point device when the additional radio environment data substantially matches the reference radio environment data.

18. The non-transitory computer readable storage media of claim 17, further comprising instructions that cause the processor to, a period of time after re-enabling service of the radio access point device, generate updated radio environment data from further wireless signals received, and adjust the reference radio environment data based on the updated radio environment data.

19. The non-transitory computer readable storage media of claim 17, further comprising instructions that cause the processor to update the reference radio environment data based on the additional radio environment data.

20. The non-transitory computer readable storage media of claim 17, wherein the instructions that cause the processor to compare the additional radio environment data with the reference radio environment data comprise instructions that cause the processor to compare a portion of the additional radio environment data generated at reboot of the radio access point device with a corresponding portion of the reference radio environment data.

* * * * *